United States Patent
Lee et al.

(10) Patent No.: US 9,424,637 B2
(45) Date of Patent: Aug. 23, 2016

(54) VESSEL SEGMENTATION METHOD AND APPARATUS USING MULTIPLE THRESHOLDS VALUES

(71) Applicant: SAMSUNG ELECTRONICS CO., LTD., Suwon-si (KR)

(72) Inventors: Hyong Euk Lee, Suwon-si (KR); Kyung Hwan Kim, Yongin-si (KR); Na Hyup Kang, Seoul (KR); Sang Wook Kim, Seoul (KR); Ji Yeon Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 13/908,058

(22) Filed: Jun. 3, 2013

(65) Prior Publication Data

US 2014/0029821 A1 Jan. 30, 2014

(30) Foreign Application Priority Data

Jul. 30, 2012 (KR) .......................... 10-2012-0082879

(51) Int. Cl.
*G06K 9/00* (2006.01)
*G06T 7/00* (2006.01)

(52) U.S. Cl.
CPC .............. *G06T 7/0012* (2013.01); *G06T 7/0081* (2013.01); *G06T 2207/10072* (2013.01); *G06T 2207/20144* (2013.01); *G06T 2207/20148* (2013.01); *G06T 2207/30101* (2013.01)

(58) Field of Classification Search
CPC ................ G06T 7/0012; G06T 7/0081; G06T 2207/10072; G06T 2207/20144; G06T 2207/20148; G06T 2207/30101; A61B 5/055; A61B 8/481; A61B 5/0275; A61B 6/00; A61B 6/481; A61B 6/504; G01R 33/281; G01R 33/5601
See application file for complete search history.

(56) References Cited

U.S. PATENT DOCUMENTS

| | | | |
|---|---|---|---|
| 2003/0056799 A1 | 3/2003 | Young et al. | |
| 2005/0033159 A1 | 2/2005 | Mistretta et al. | |
| 2005/0110791 A1 | 5/2005 | Krishnamoorthy et al. | |
| 2005/0113679 A1 | 5/2005 | Suryanarayanan et al. | |
| 2005/0187475 A1* | 8/2005 | Nakaya .................... | 600/439 |
| 2006/0020200 A1* | 1/2006 | Medow et al. ............ | 600/425 |
| 2006/0211940 A1 | 9/2006 | Antonelli et al. | |
| 2006/0251304 A1* | 11/2006 | Florin et al. ............... | 382/128 |
| 2007/0263915 A1 | 11/2007 | Mashiach | |

(Continued)

FOREIGN PATENT DOCUMENTS

| | | |
|---|---|---|
| KR | 10-2011-0015058 | 2/2011 |
| KR | 10-1144774 | 5/2012 |

OTHER PUBLICATIONS

Lesage, et al. "A review of 3D vessel lumen segmentation techniques: Models, features and extraction schemes." Medical image analysis 13.6 (2009): 819-845.

(Continued)

*Primary Examiner* — Amara Abdi
(74) *Attorney, Agent, or Firm* — NSIP Law

(57) ABSTRACT

A vessel segmentation method includes acquiring an image of a blood vessel, including cross sections, using a contrast medium. The method further includes setting a threshold value for each of the cross sections based on data of an intensity of the contrast medium. The method further includes performing vessel segmentation based on the image and the threshold value for each of the cross sections.

21 Claims, 8 Drawing Sheets

(56) References Cited

U.S. PATENT DOCUMENTS

| | | | |
|---|---|---|---|
| 2008/0187197 A1 | 8/2008 | Slabaugh et al. | |
| 2009/0012382 A1* | 1/2009 | Dutta | A61B 5/02007 600/407 |
| 2010/0296709 A1 | 11/2010 | Ostrovsky-Berman et al. | |
| 2011/0105879 A1* | 5/2011 | Masumoto | G06F 19/321 600/407 |
| 2011/0293150 A1 | 12/2011 | Capolunghi et al. | |
| 2012/0075638 A1 | 3/2012 | Rollins et al. | |
| 2013/0066198 A1* | 3/2013 | Grant et al. | 600/428 |

OTHER PUBLICATIONS

Extended European Search Report mailed Nov. 21, 2013 in counterpart European Application No. 13178548.7 (12 pages, in English).

\* cited by examiner

VESSEL SEGMENTATION METHOD AND APPARATUS USING MULTIPLE THRESHOLDS VALUES

CROSS-REFERENCE TO RELATED APPLICATION

This application claims the benefit under 35 USC 119(a) of Korean Patent Application No. 10-2012-0082879, filed on Jul. 30, 2012, in the Korean Intellectual Property Office, the entire disclosure of which is incorporated herein by reference for all purposes.

BACKGROUND

1. Field

The following description relates to a vessel segmentation method and a vessel segmentation apparatus, using multiple threshold values.

2. Description of Related Art

Diagnostic equipment based on a medical imaging technique, for example, computed tomography (CT) scanning and magnetic resonance imaging (MRI), aid in diagnosing diseases, for example, cancer and a stenosis. For example, MRI of a liver may be used to locate a tumor in the liver and to remove the tumor through invasive or non-invasive treatment. Also, high-resolution CT scan may be used to determine whether a tumor is present or has been removed after medical treatment.

The medical imaging-based diagnostic equipment may also be used for blood vessel segmentation. In this example, a medical contrast medium may be used to enhance a visualization of, e.g., a structure of blood vessels and a blood flow. That is, a shape of the blood vessels may be recognized using a blood vessel image taken with the diagnostic equipment after injection of the contrast medium.

SUMMARY

In one general aspect, there is provided a vessel segmentation method including acquiring an image of a blood vessel, including cross sections, using a contrast medium. The method further includes setting a threshold value for each of the cross sections based on data of an intensity of the contrast medium. The method further includes performing vessel segmentation based on the image and the threshold value for each of the cross sections.

In another general aspect, there is provided a vessel segmentation apparatus including a processor configured to acquire an image of a blood vessel, including cross sections, using a contrast medium. The processor is further configured to set a threshold value for each of the cross sections based on data of an intensity of the contrast medium. The processor is further configured to perform vessel segmentation based on the image and the threshold value for each of the cross sections.

Other features and aspects will be apparent from the following detailed description, the drawings, and the claims.

DETAILED DESCRIPTION

Figure 1:
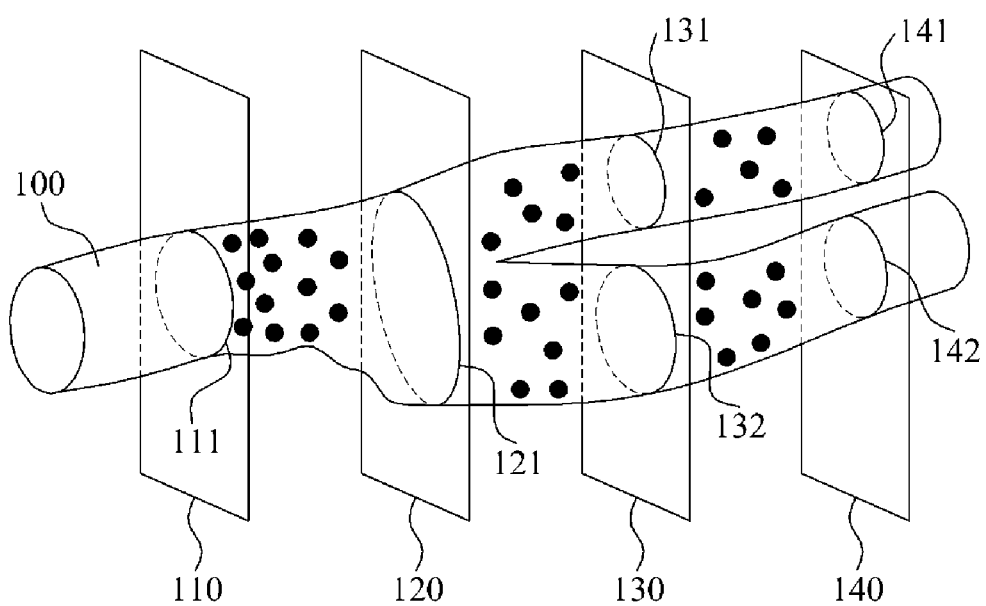
FIG. 1 is a diagram illustrating an example of an image including slices that is acquired using a contrast medium for vessel segmentation.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an example of an image including slices that is acquired using a contrast medium for vessel segmentation. Referring to FIG. 1, a vessel segmentation method includes acquiring the image of a blood vessel 100 that includes the slices, each of which includes at least one cross section, using the contrast medium for the vessel segmentation.

In more detail, the image includes a slice 110, a slice 120, a slice 130, and a slice 140. The slice 110 includes a cross section 111, and the slice 120 includes a cross section 121. The slice 130 includes a cross section 131 and a cross section 132, and the slice 140 includes a cross section 141 and a cross section 142.

The contrast medium includes a substance (e.g., black dots) injected into the blood vessel 100 to enhance visibility of the blood vessel 100 in the image. For example, the contrast medium may include a computed tomography (CT) contrast medium, a magnetic resonance imaging (MRI) contrast medium, and/or other contrast mediums known to one of ordinary skill in the art.

The vessel segmentation method further includes determining each region of the image that corresponds to the blood vessel 100 based on an intensity (e.g., strength of visibility) of the contrast medium in the image. For example, each region of the image that corresponds to the blood vessel 100 may include the intensity of the contrast medium that is greater than or equal to a predetermined threshold value for the corresponding cross section The vessel segmentation method may further include determining each other region of the image that does not correspond to the blood vessel 100 and that includes the intensity of the contrast medium that is less than the predetermined threshold value for the corresponding cross section. According to an embodiment, the intensity of a contrast medium may include the brightness of a pixel corresponding to the contrast medium in a medical image when the medical image is taken after the contrast medium is injected to the blood vessels. Further, according to another embodiment, the intensity of a contrast medium may include the strength of visibility of the contrast medium in the medical image.

In more detail, the blood vessel 100 includes a tree structure. The blood vessel 100 includes a stem, a node, and branches. A portion between the cross section 111 and the cross section 121 corresponds to the stem, a portion between the cross section 121 and the cross section 132 corresponds to the node, and portions between the cross section 131 and the cross section 141 and between the cross section 132 and the cross section 142 correspond to first and second branches, respectively. Although not shown, the stem may be a branch of another stem, and each of the branches may be a stem of another branch.

The contrast medium injected into the stem flows through the node to the branches. As a number of the branches splitting-off from the stem increases, a total size of a cross section of the blood vessel 100 increases. For example, a total size of the cross section 131 and the cross section 132 is greater than a size of the cross section 111. Accordingly, an amount of the contrast medium per unit volume that flows through the cross section corresponding to the branch is less than an amount of the contrast medium per unit volume that flows through the cross section corresponding to the stem. As such, the intensity of the contrast medium in the image at the cross section corresponding to the branch is less than the intensity of the contrast medium in the image at the cross section corresponding to the stem. Therefore, after the contrast medium flows through the node, the intensity of the contrast medium decreases. The vessel segmentation method may improve accuracy of the vessel segmentation based on the intensity decreasing after the contrast medium flows through the node, which is hereinafter referred to as a node-dependent attenuation characteristic.

The vessel segmentation method further includes setting threshold values, with respect to the intensity of the contrast medium in the image, for the cross sections 111, 121, 131, 132, 141, and 142, respectively, based on modeling data of the intensity of the contrast medium, including, e.g., the node-dependent attenuation characteristic. The vessel segmentation method further includes performing the vessel segmentation of the blood vessel in the image, including determining a boundary of the blood vessel 100 for each of the cross sections 111, 121, 131, 132, 141, and 142 in the image based on the set threshold values for the respective cross sections 111, 121, 131, 132, 141, and 142, and the intensity of the contrast medium.

Accordingly, the vessel segmentation method may improve accuracy of vessel segmentation of a medical image obtained through CT scanning, MRI imaging, and/or other medical imaging methods known to one of ordinary skill in the art. Consequently, the vessel segmentation method may improve accuracy of reconstruction and visualization of a three-dimensional (3D) image of the blood vessel that is generated based on the vessel segmentation.

Further, the vessel segmentation method may provide high precision data, for example, data in which different shape characteristics of a blood vessel in an individual are reflected accurately. Accordingly, the vessel segmentation method may provide a simulation-based, high-precision, personalized medical service including high-precision, computerized diagnosis, treatment, and prediction. Also, the vessel segmentation method may extract information accurately while reducing an amount of contrast medium injected that may have an adverse effect on a kidney.

In advance of providing a detailed description of the vessel segmentation method with reference to FIGS. 3 through 8, an example of the intensity of the contrast medium that decreases over time or distance is described with reference to FIG. 2.

Figure 2:
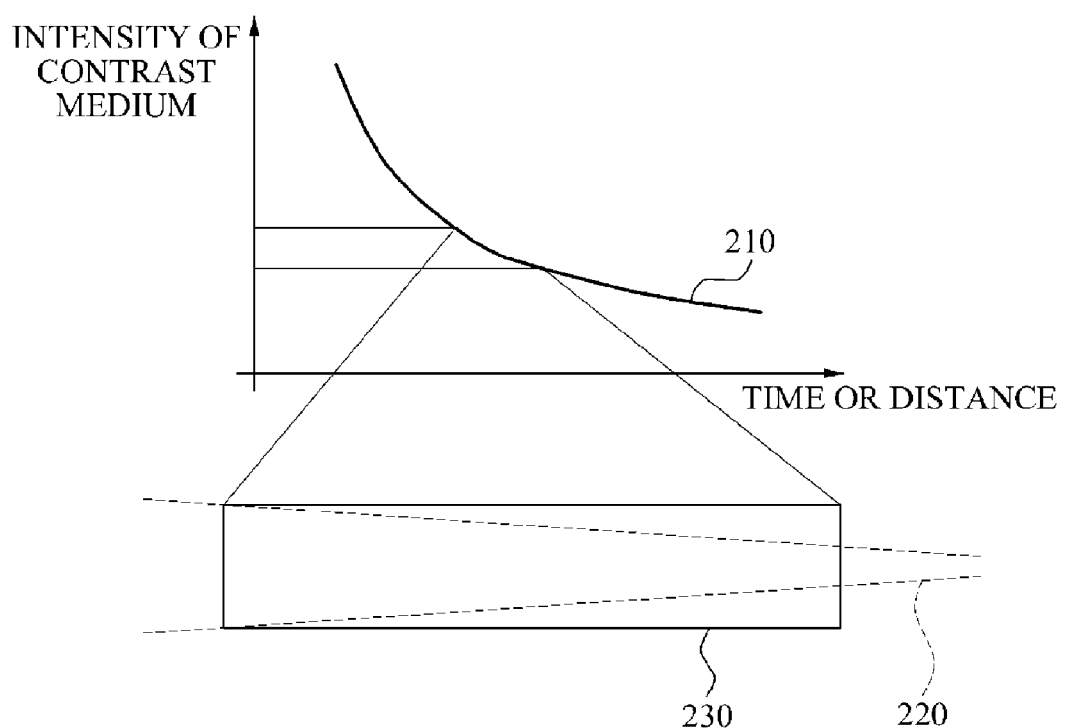
FIG. 2 is a diagram illustrating an example of an intensity of a contrast medium that decreases over time or distance.

FIG. 2 is a diagram illustrating an example of an intensity of a contrast medium that decreases over time or distance. Referring to FIG. 2, the intensity of the contrast medium injected into a blood vessel decreases as a time elapsed from the injection of the contrast medium increases, or a distance traveled by the contrast medium through the blood vessel increases.

For example, the vessel segmentation method may include modeling the intensity of the contrast medium that decreases over the time elapsed, which is hereinafter referred to as a time-dependent attenuation characteristic. In another example, the vessel segmentation method may include modeling the intensity of the contrast medium that decreases over the distance traveled, which is hereinafter referred to as a distance-dependent attenuation characteristic. The vessel segmentation method may include plotting a curve 210 to model the time-dependent or distance-dependent attenuation characteristic.

The vessel segmentation method may improve accuracy of vessel segmentation based on the time-dependent attenuation characteristic and/or the distance-dependent attenuation characteristic. The time-dependent attenuation characteristic and the distance-dependent attenuation characteristic may be included in the modeling data of the intensity of the contrast medium that is described with reference to FIG. 1.

In more detail, referring again to FIG. 1, the vessel segmentation method includes setting threshold values, with respect to the intensity of the contrast medium in the image, for the cross sections 111, 121, 131, 132, 141, and 142, respectively, based on the time-dependent attenuation characteristic and/or the distance-dependent attenuation characteristic. Accordingly, the vessel segmentation method may improve accuracy of the vessel segmentation.

For example, when the contrast medium flows from the cross section 131 to the cross section 141, and a size of the cross section 131 is substantially equal to a size of the cross section 141, the intensity of the contrast medium decreases based on the time-dependent attenuation characteristic and/or the distance-dependent attenuation characteristic. If a single predetermined threshold value, with respect to the intensity of the contrast medium in the image, is used to determine the boundary of the blood vessel 100 for each of the cross sections 131 and 141, a resulting size of a region of the blood vessel 100 at the cross section 141 may be less than a resulting size of a region of the blood vessel 100 at the cross section 131 due to the time-dependent attenuation characteristic and/or the distance-dependent attenuation characteristic. Referring again to FIG. 2, this error is represented as a dashed line 220.

To correct this error, the vessel segmentation method includes the setting of the multiple threshold values, with respect to the intensity of the contrast medium in the image, for the cross sections 111, 121, 131, 132, 141, and 142, respectively, based on the time-dependent attenuation characteristic and/or the distance-dependent attenuation characteristic. That is, the vessel segmentation method sets a threshold value used to determine the boundary of the blood vessel 100 for the cross section 131, and a different threshold value used to determine the boundary of the blood vessel 100 for the cross section 141. Accordingly, a resulting size of the region of the blood vessel 100 at the cross section 131 is substantially equal to a resulting size of the region of the blood vessel 100 at the cross section 141. Referring again to FIG. 2, this result is represented as a straight line 230.

Hereinafter, the vessel segmentation method using the multiple threshold values is described with reference to FIGS. 3 through 8.

Figure 3:
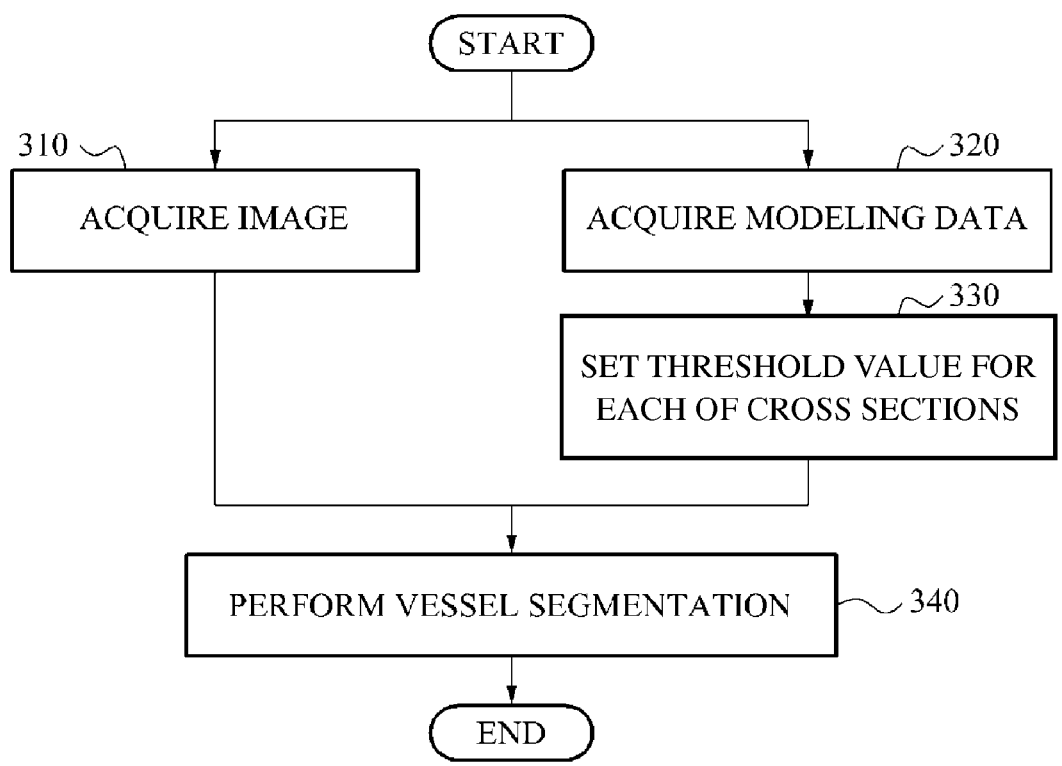
FIG. 3 is a flowchart illustrating an example of a vessel segmentation method using multiple threshold values.

FIG. 3 is a flowchart illustrating an example of a vessel segmentation method using multiple threshold values. Referring to FIG. 3, in operation 310, the vessel segmentation method includes acquiring an image of a blood vessel that includes slices, using a contrast medium injected into the blood vessel. Each of the slices may include at least one cross section of the blood vessel.

In operation 320, the vessel segmentation method includes acquiring modeling data of an intensity of the contrast medium from a predetermined database. The predetermined database stores in advance the modeling data, and may include, for example, a local memory, a remotely-located server, and/or other storage known to one of ordinary skill in the art. A variety of modifications, variations, and equivalents are possible in light of the foregoing description, which will be apparent to a person of ordinary skill in the art to which the description pertains. As described with reference to FIGS. 1 and 2, the modeling data may include the node-dependent attenuation characteristic, the time-dependent attenuation characteristic, and/or the distance-dependent attenuation characteristic. A detailed description of the modeling data is provided with reference to FIG. 4.

In operation 330, the vessel segmentation method includes setting a threshold value for each of cross sections of the blood vessel, with respect to the intensity of the contrast medium in the acquired image, based on the acquired modeling data. The threshold values are used to determine a boundary of the blood vessel for each of the cross sections in the acquired image. As described with reference to FIGS. 1 and 2, the vessel segmentation method may improve accuracy of vessel segmentation by using the multiple threshold values for the respective cross sections.

In more detail, the vessel segmentation method includes determining the intensity of the contrast medium in each of the cross sections based on the modeling data. For example, referring to FIGS. 1 and 2, the vessel segmentation method may include determining the intensity of the contrast medium in each of the cross sections based on the node-dependent attenuation characteristic, the time-dependent attenuation characteristic, and/or the distance-dependent attenuation characteristic, such that, e.g., the intensity of the contrast medium in the cross section 142 is less than the intensity of the contrast medium in the cross section 132. The vessel segmentation method further includes setting the threshold value for each of the cross sections based on the determined intensity of the contrast medium in each of the cross sections. For example, the vessel segmentation method may include setting the threshold value for the cross section including the relatively lesser intensity of the contrast medium to be less than the threshold value in the cross section including the relatively greater intensity of the contrast medium. The setting of the threshold value for each of the cross sections is described in further detail with reference to FIG. 5.

In operation 340, the vessel segmentation method includes performing the vessel segmentation of the blood vessel in the acquired image based on the set threshold value for each of the cross sections, and the intensity of the contrast medium in the image. The vessel segmentation includes determining the boundary of the blood vessel for each of the cross sections in the image by comparing the intensity of the contrast medium in the cross section in the image to the threshold value for the same cross section. When the intensity of the contrast medium in the cross sections in the image is greater than or equal to the threshold value for the same cross section, the vessel segmentation includes determining the cross section to be the boundary of the blood vessel for the same cross section. The boundary of the blood vessel for each of the cross sections is determined by performing the foregoing operations for each of the cross sections iteratively.

In more detail, the intensity of the contrast medium in the image may be different from the intensity of the contrast medium that is associated with the modeling data. For example, an image acquired through CT scanning or MRI imaging may be a black-and-white image. Regions of a blood vessel in the image may be influenced by a grayscale, that is, an intensity in a black-and-white image acquired using a contrast medium injected into a blood vessel. That is, the intensity of the contrast medium in the image may correspond to the intensity in the black-and-white image.

Accordingly, the vessel segmentation further includes determining each region (e.g., cross section) of the image that corresponds to the blood vessel and that includes the intensity of the contrast medium that is greater than or equal to the threshold value for the corresponding cross section. The vessel segmentation may further include determining each other region of the image that does not correspond to the blood vessel and that includes the intensity of the contrast medium that is less than the threshold value for the corresponding cross section. As such, the boundary of the blood vessel for each of the cross sections in the image may be determined, in which the intensity of the contrast medium in each of the cross sections is greater than or equal to the threshold value for the corresponding cross section. The boundary of the blood vessel for each of the cross sections is determined by performing the foregoing operations for each of the cross sections iteratively.

The vessel segmentation further includes comparing locations of the determined boundaries of the blood vessel between neighboring cross sections among the cross sections. When a difference in the locations of the determined boundaries between the neighboring cross sections is detected, the vessel segmentation further includes segmenting or extracting a shape of the blood vessel between the neighboring cross sections.

Figure 4:
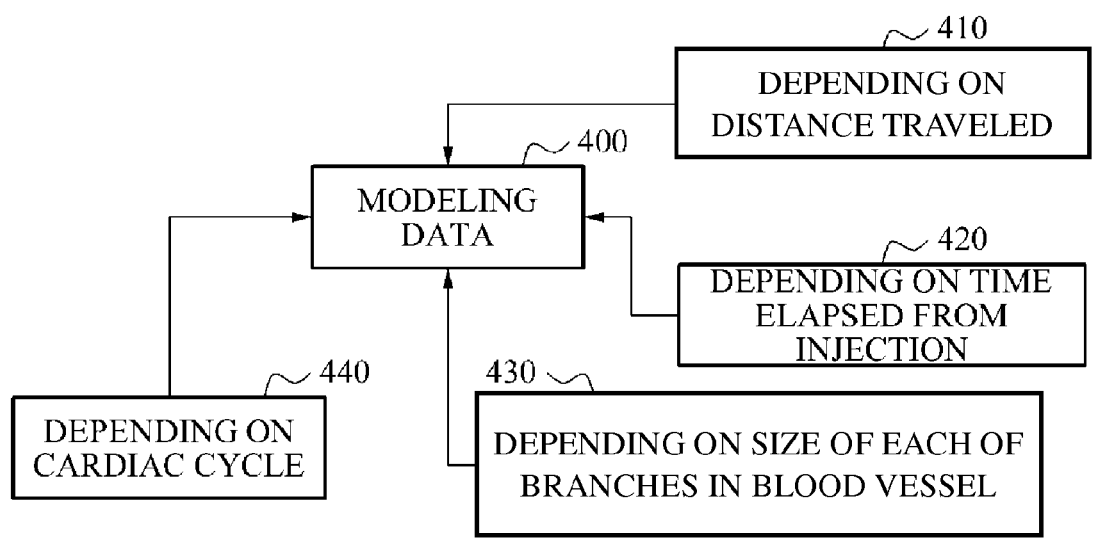
FIG. 4 is a block diagram illustrating an example of modeling data of an intensity of a contrast medium.

FIG. 4 is a block diagram illustrating an example of modeling data 400 of an intensity of a contrast medium. Referring to FIG. 4, the modeling data 400 includes data 410 of the intensity of the contrast medium injected into a blood vessel, depending on a distance traveled by the contrast medium through the blood vessel, and data 420 of the intensity of the contrast medium, depending on a time elapsed from the injection of the contrast medium. The modeling data 400 further includes data 430 of the intensity of the contrast medium, depending on a size of each of branches in the blood vessel, and data 440 of the intensity of the contrast medium, depending on a cardiac cycle.

The data 410 of the intensity of the contrast medium, depending on the distance traveled by the contrast medium through the blood vessel, includes the distance-dependent attenuation characteristic described with reference to FIG. 2.

As the distance traveled by the contrast medium through the blood vessel increases, the intensity of the contrast medium decreases.

The data 420 of the intensity of the contrast medium, depending on the time elapsed from the injection of the contrast medium, includes the time-dependent attenuation characteristic described with reference to FIG. 2. As the time elapsed from the injection of the contrast medium increases, the intensity of the contrast medium decreases.

The data 430 of the intensity of the contrast medium, depending on the size of each of the branches in the blood vessel, includes the node-dependent attenuation characteristic described with reference to FIG. 1. As a number of nodes in the blood vessel being passed through by the contrast medium increases, the size of each of the branches in the blood vessel increases, and the intensity of the contrast medium decreases.

The data 440 of the intensity of the contrast medium, depending on the cardiac cycle, includes a cardiac cycle-dependent inequality characteristic that refers to the intensity of the contrast medium changing based on the cardiac cycle. In more detail, the contrast medium may flow through the blood vessel based on the cardiac cycle. For example, during heart contractions, blood pressure increases and blood flow increases, and thus, the contrast medium may flow through the blood vessel at a rapid rate. As the heart relaxes, blood pressure decreases and blood flow decreases, and thus, the contrast medium may flow through the blood vessel at a low rate.

Accordingly, a distribution of the contrast medium in the blood vessel may be non-uniform. That is, the contrast medium may be concentrated or dispersed at each portion of the blood vessel based on the cardiac cycle. Further, a density of the contrast medium in the blood vessel may be different for each portion of the blood vessel based on the cardiac cycle. When the concentration or density of the contrast medium is great in amount, the intensity of the contrast medium is great in amount. When the concentration or density of the contrast medium is low in amount, the intensity of the contrast medium is low in amount.

Figure 5:
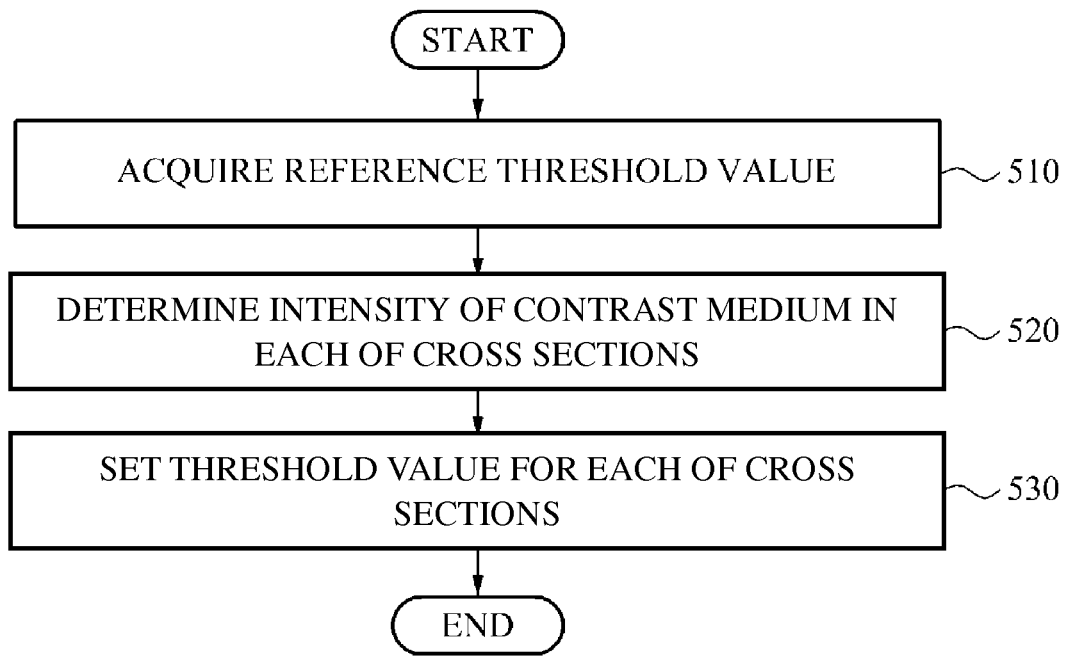
FIG. 5 is a flowchart illustrating an example of a method of setting multiple threshold values based on modeling data of an intensity of a contrast medium.

FIG. 5 is a flowchart illustrating an example of a method of setting multiple threshold values based on modeling data of an intensity of a contrast medium. Referring to FIG. 5, in operation 510, a vessel segmentation method includes acquiring a reference threshold value, with respect to the intensity of the contrast medium injected into a blood vessel in an image, from a predetermined database. The predetermined database stores in advance the reference threshold value, and may include, for example, a local memory, a remotely-located server, and/or other storage known to one of ordinary skill in the art. A variety of modifications, variations, and equivalents are possible in light of the foregoing description, which will be apparent to a person of ordinary skill in the art to which the description pertains.

In operation 520, the vessel segmentation method includes determining the intensity of the contrast medium in each of cross sections of the blood vessel based on the modeling data. For example, referring to FIG. 1, the vessel segmentation method may include determining the intensity of the contrast medium in each of the cross sections based on the time-dependent attenuation characteristic, such that the intensity of the contrast medium in the cross section 142 is less than the intensity of the contrast medium in the cross section 132.

In another example, the vessel segmentation method may include determining the intensity of the contrast medium in each of the cross sections based on the distance-dependent attenuation characteristic, such that the intensity of the contrast medium in the cross section 121 is less than the intensity of the contrast medium in the cross section 111. In still another example, the vessel segmentation method may include determining the intensity of the contrast medium in each of the cross sections based on the node-dependent attenuation characteristic, such that the intensity of the contrast medium in the cross section 132 (e.g., of the branch) is less than the intensity of the contrast medium in the cross section 121 (e.g., of the node).

In yet another example, the vessel segmentation method may include determining the intensity of the contrast medium in each of the cross sections based on the cardiac cycle-dependent inequality characteristic. In this example, when a density of the contrast medium in the cross section 121 is relatively greater than a density of the contrast medium in the cross section 111 based on the cardiac cycle, the vessel segmentation method may include determining the intensity of the contrast medium in the cross section 111 to be less than the intensity of the contrast medium in the cross section 121.

In still another example, the vessel segmentation method may include determining the intensity of the contrast medium in each of the cross sections based on at least two of the time-dependent attenuation characteristic, the distance-dependent attenuation characteristic, the node-dependent attenuation characteristic, and the cardiac cycle-dependent inequality characteristic. In this example, the vessel segmentation method may include determining a weight value for each of the characteristics based on predetermined physiological characteristics. The vessel segmentation method may further include determining the intensity of the contrast medium in each of the cross sections further based on the determined weight value for each of the characteristics. The vessel segmentation method may further include presetting a weight value for each of the characteristics based on experimental data, and determining the intensity of the contrast medium in each of the cross sections further based on the preset weight value for each of the characteristics.

In this example, the weight value may include a size of an effect of the corresponding characteristic on the intensity of the contrast medium. The weight value for the characteristic may be set to '0' to exclude the characteristic from being used to determine the intensity of the contrast medium.

In this example, the vessel segmentation method may further include determining the intensity of the contrast medium in the cross section based on a weighted sum of the weight values for the respective characteristics that are multiplied by the respective determined intensities of the contrast medium in the same cross section. For example, the weight value for the time-dependent attenuation characteristic may be set to '0.30', the weight value for the node-dependent attenuation characteristic may be set to '0.70', and the weight values for the other characteristics may be set to '0'. A first value of the intensity of the contrast medium in the cross section may be determined based on the time-dependent attenuation characteristic, and a second value of the intensity of the contrast medium in the same cross section may be determined based on the node-dependent attenuation characteristic. Accordingly, a final value of the intensity of the contrast medium in the same cross section may be determined based on the weighted sum of 30% of the first value and 70% of the second value.

In operation 530, the vessel segmentation method includes setting a threshold value for each of the cross sections based on the acquired reference threshold value and the determined intensity of the contrast medium in each of the cross sections. That is, the vessel segmentation method includes setting the threshold value for the cross section including the relatively lesser intensity of the contrast medium to be less than the threshold value for the cross section including the relatively greater intensity. In more detail, the vessel segmentation method includes setting the threshold value for the cross section including the relatively lesser intensity of the contrast medium to be less than the reference threshold value. The vessel segmentation method further includes setting the threshold value for the cross section including the relatively greater intensity of the contrast medium to be greater than the reference threshold value. In this example, the vessel segmentation method may include multiplying the reference threshold value by a scaling factor to set the threshold value for the cross section to be greater or less than the reference threshold value. The vessel segmentation method may include determine the scaling factor based on a rate of decrease in the determined intensity of the contrast medium in the corresponding cross section.

Figure 6:
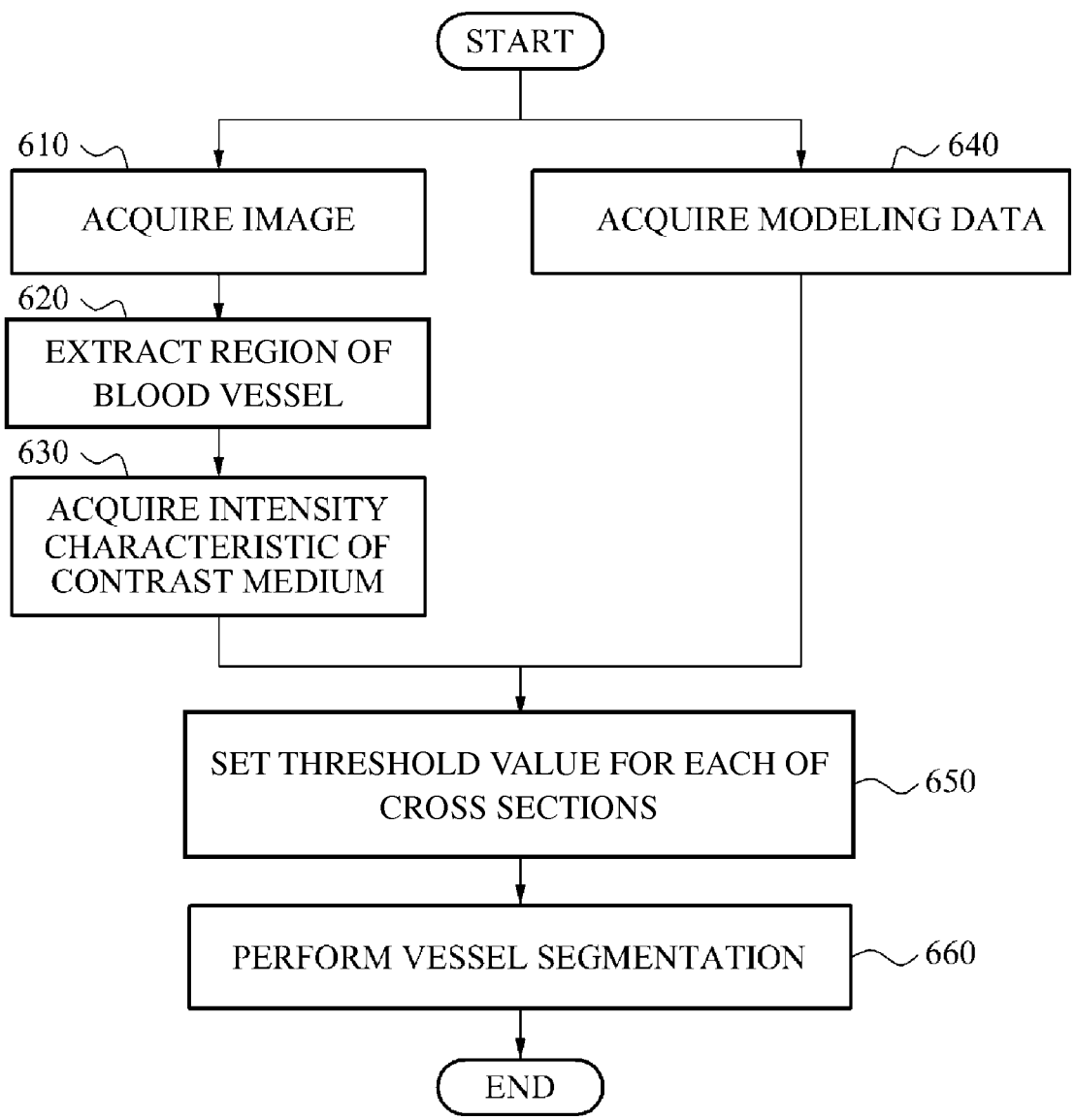
FIG. 6 is a flowchart illustrating an example of a vessel segmentation method based on an intensity characteristic of a contrast medium, depending on characteristics of a blood vessel.

FIG. 6 is a flowchart illustrating an example of a vessel segmentation method based on an intensity characteristic of a contrast medium, depending on characteristics of blood a vessel. Referring to FIG. 6, in operation 610, the vessel segmentation method includes acquiring an image of the blood vessel that includes slices, using a contrast medium injected into the blood vessel. For example, each of the slices may include at least one cross section of the blood vessel.

In operation 620, the vessel segmentation method includes extracting a region of the blood vessel from the acquired image. For example, the region of the blood vessel may be extracted by performing various conventional methods using a single threshold value.

In operation 630, the vessel segmentation method includes acquiring an intensity characteristic of the contrast medium in the extracted region of the blood vessel. The intensity characteristic of the contrast medium depends on the characteristics of the blood vessel.

In more detail, the vessel segmentation method may include calculating a mean intensity of the contrast medium in the extracted region of the blood vessel. Due to the different characteristics of the blood vessel, although the same type of contrast medium is injected at the same concentration, the intensity of the contrast medium in the image may differ. Accordingly, the mean intensity of the contrast medium in the extracted region of the blood vessel may be calculated to acquire the intensity characteristic of the contrast medium, depending on the different characteristics of the blood vessel.

Figure 7:
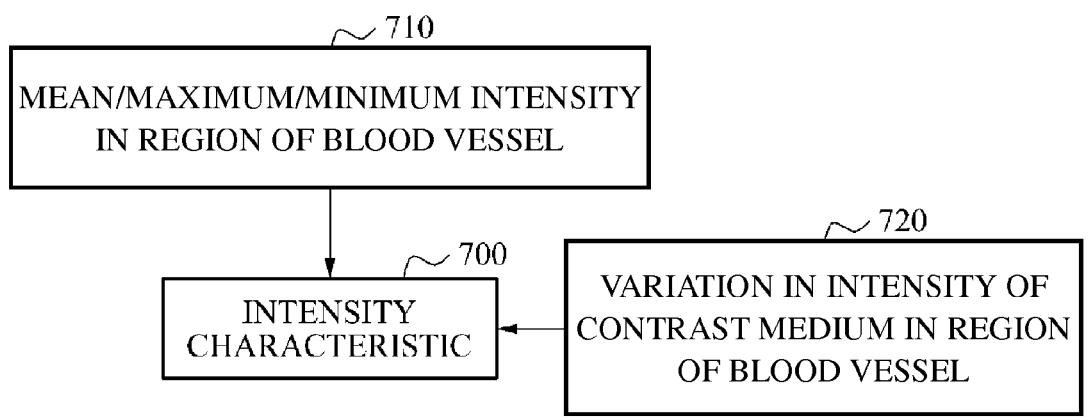
FIG. 7 is a block diagram illustrating an example of an intensity characteristic of a contrast medium, depending on characteristics of a blood vessel.

FIG. 7 is a block diagram illustrating an example of an intensity characteristic 700 of a contrast medium, depending on characteristics of a blood vessel. Referring to FIG. 7, the intensity characteristic 700 of the contrast medium includes a mean intensity 710 of the contrast medium in a region of the blood vessel that is extracted from an image of the blood vessel, a maximum intensity 710 of the contrast medium in the region, and/or a minimum intensity 710 of the contrast medium in the region. The intensity characteristic 700 further includes a variation 720 in the intensity of the contrast medium in the region of the blood vessel.

For example, the maximum intensity 710 may include a greatest intensity of the contrast medium in the region of the blood vessel. The minimum intensity 710 may include a lowest intensity of the contrast medium in the region. The variation 720 in the intensity of the contrast medium in the region may include a degree by which the intensity of the contrast medium decreases in the region.

Referring again to FIG. 6, in operation 640, the vessel segmentation method includes acquiring modeling data from a predetermined database. Since the acquiring of the modeling data that is described with reference to FIG. 3 may be applied to the acquiring of the modeling data that is described herein, a further detailed description is omitted herein for conciseness.

In operation 650, the vessel segmentation method includes setting a threshold value for each of cross sections of the blood vessel, with respect to an intensity of the contrast medium in the acquired image, based on the acquired intensity characteristic of the contrast medium and the acquired modeling data. The threshold value for each of the cross sections is used to determine a boundary of the blood vessel for each of the cross sections in the image.

In more detail, the vessel segmentation method includes determining the intensity of the contrast medium in each of the cross sections based on the intensity characteristic of the contrast medium and the modeling data. For example, referring to FIGS. 1, 2, 6, and 7, the vessel segmentation method may include determining the intensity of the contrast medium in each of the cross sections based on the mean intensity of the contrast medium in the region of the blood vessel, the maximum intensity of the contrast medium in the region, the minimum intensity of the contrast medium in the region, the variation in the intensity of the contrast medium in the region, the node-dependent attenuation characteristic, the time-dependent attenuation characteristic, and/or the distance-dependent attenuation characteristic. The vessel segmentation method further includes setting the threshold value for each of the cross sections based on the determined intensity of the contrast medium in each of the cross sections. The setting of the threshold value in each of the cross sections based on the intensity characteristic of the contrast medium is described in further detail with reference to FIG. 8.

In operation 660, the vessel segmentation method includes performing vessel segmentation of the blood vessel in the acquired image based on the set threshold value for each of the cross sections, and the intensity of the contrast medium in the image. Since the performing of the vessel segmentation that is described with reference to FIG. 3 may be applied to the performing of the vessel segmentation that is described herein, a further detailed description is omitted herein for conciseness.

Figure 8:
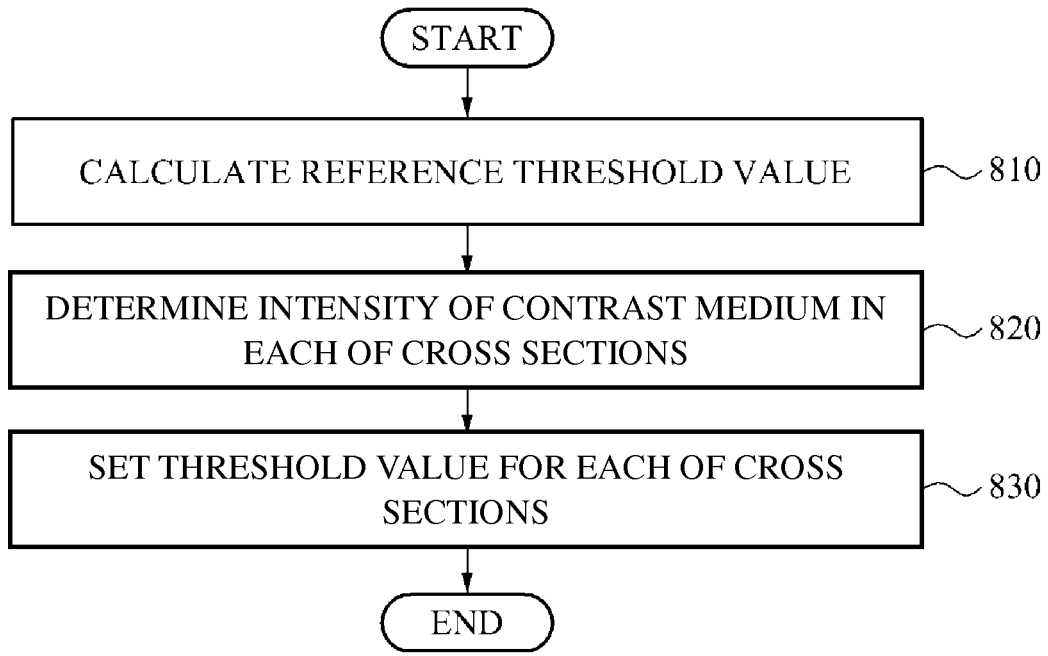
FIG. 8 is a flowchart illustrating an example of a method of setting multiple threshold values based on an intensity characteristic of a contrast medium, depending on characteristics of a blood vessel.

FIG. 8 is a flowchart illustrating an example of a method of setting multiple threshold values based on an intensity characteristic of a contrast medium, depending on characteristics of a blood vessel. Referring to FIG. 8, in operation 810, the vessel segmentation method includes calculating a reference threshold value based on the intensity characteristic of the contrast medium.

For example, the vessel segmentation method may include calculating a mean intensity of the contrast medium in a region of the blood vessel that is extracted from an image of the blood vessel, and setting the mean intensity to be the reference threshold value. In another example, the vessel segmentation method may include calculating a maximum intensity of the contrast medium in the region or a minimum intensity of the contrast medium in the region, and setting the maximum intensity or the minimum intensity to be the reference threshold value. A variety of modifications, variations, and equivalents are possible in light of the foregoing description, which will be apparent to a person of ordinary skill in the art to which the description pertains.

In operation 820, the vessel segmentation method includes determining the intensity of the contrast medium in each of cross sections of the blood vessel based on the intensity characteristic of the contrast medium and the modeling data. For example, the vessel segmentation method may include determining the intensity of the contrast medium in each of the cross sections, such that the intensity of the contrast medium in the cross section 121 of FIG. 1 is less than the intensity of the contrast medium in the cross section 111 of FIG. 1, based on the mean intensity of the contrast medium in the region of the blood vessel, the maximum intensity of the contrast medium in the region, the minimum intensity of the contrast medium in the region, and/or a variation in the intensity of the contrast medium in the region.

In another example, the vessel segmentation method may include determining the intensity of the contrast medium in each of the cross sections based on a node-dependent attenuation characteristic, a time-dependent attenuation characteristic, a distance-dependent attenuation characteristic, and/or a cardiac cycle-dependent inequality characteristic. Since the determining of the intensity of the contrast medium based on the modeling data that is described with reference to FIG. 5 may be applied to the determining of the intensity of the contrast medium based on the modeling data that is described herein, a further detailed description is omitted herein for conciseness.

In still another example, the vessel segmentation method may include determining the intensity of the contrast medium based on a combination of at least two of the mean intensity of the contrast medium in the region of the blood vessel, the maximum intensity of the contrast medium in the region, the minimum intensity of the contrast medium in the region, the variation in the intensity of the contrast medium in the region, the node-dependent attenuation characteristic, the time-dependent attenuation characteristic, the distance-dependent attenuation characteristic, and/or the cardiac cycle-dependent inequality characteristic. In this example, the vessel segmentation method may include determining a weight value for each of the characteristics based on predetermined physiological characteristics. The vessel segmentation method may further include determining the intensity of the contrast medium in each of the cross sections further based on the determined weight value for each of the characteristics. The vessel segmentation method may further include presetting a weight value for each of the characteristics based on experimental data, and determining the intensity of the contrast medium in each of the cross sections further based on the preset weight value for each of the characteristics.

In this example, the weight value may include a size of an effect of the corresponding characteristic on the intensity of the contrast medium. The weight value for the characteristic may be set to '0' to exclude the characteristic from being used to determine the intensity of the contrast medium.

In this example, the vessel segmentation method may further include determining the intensity of the contrast medium in the cross section based on a weighted sum of the weight values for the respective characteristics that are multiplied by the respective determined intensities of the contrast medium in the same cross section. For example, the weight value for the variation in the intensity of the contrast medium in the region of the blood vessel may be set to '0.60', the weight value for the node-dependent attenuation characteristic may be set to '0.30', the weight value for the cardiac cycle-dependent inequality characteristic may be set to '0.10', and the weight values for the other characteristics may be set to '0'. A first value of the intensity of the contrast medium in the cross section may be determined based on the variation in the intensity of the contrast medium in the region, a second value of the intensity of the contrast medium in the cross section may be determined based on the node-dependent attenuation characteristic, and a third value of the intensity of the contrast medium in the cross section may be determined based on the cardiac cycle-dependent inequality characteristic. Accordingly, a final value of the intensity of the contrast medium in the same cross section may be determined based on the weighted sum of 60% of the first value, 30% of the second value, and 10% of the third value.

In yet another example, the vessel segmentation method may include correcting the time-dependent attenuation characteristic, the distance-dependent attenuation characteristic, and/or the node-dependent attenuation characteristic, based on the intensity characteristic of the contrast medium, for example, the mean intensity of the contrast medium in the region of the blood vessel, the maximum intensity of the contrast medium in the region, the minimum intensity of the contrast medium in the region, or the variation in the intensity of the contrast medium in the region. In this example, the time-dependent attenuation characteristic may be acquired by modeling the intensity of the contrast medium based on physical characteristics or median data of the contrast medium.

In still another example, the vessel segmentation method may include correcting the time-dependent attenuation characteristic, the distance-dependent attenuation characteristic, and/or the node-dependent attenuation characteristic, based on physiological characteristics of an interaction between the blood vessel and the contrast medium, or data of different characteristics of the blood vessel. In these examples, the vessel segmentation method may further include determining the intensity of the contrast medium in each of the cross sections based on the corrected time-dependent attenuation characteristic, the corrected distance-dependent attenuation characteristic, and/or the corrected node-dependent attenuation characteristic.

In operation 830, the vessel segmentation method includes setting a threshold value for each of the cross sections based on the calculated reference threshold value and the determined intensity of the contrast medium in each of the cross sections. That is, the vessel segmentation method includes setting the threshold value for the cross section including the relatively lesser intensity of the contrast medium to be less than the threshold value for the cross section including the relatively greater intensity. In more detail, the vessel segmentation method includes setting the threshold value for the cross section including the relatively lesser intensity of the contrast medium to be less than the reference threshold value. The vessel segmentation method further includes setting the threshold value for the cross section including the relatively greater intensity of the contrast medium to be greater than the reference threshold value. In this example, the vessel segmentation method may including multiplying the reference threshold value by a scaling factor to set the threshold value for the cross section to be greater or less than the reference threshold value. The vessel segmentation method may include determine the scaling factor based on a rate of decrease in the determined intensity of the contrast medium in the corresponding cross section.

The various methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may include various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions that control a processing device to implement a software component may include a computer program, a piece of code, an instruction, or some combination thereof, that independently or collectively instructs or configures the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments that implement the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A vessel segmentation method comprising:
acquiring an image of a blood vessel, comprising cross sections, using a contrast medium;
setting a threshold value for each of the cross sections based on modeling data associated with an intensity of the contrast medium, the modeling data comprising a node-dependent attenuation characteristic varying responsive to a total size of cross sections of branches splitting-off from a stem of the blood vessel relative to a size of the cross section of the stem; and
performing vessel segmentation based on the image and the threshold value for each of the cross sections.

2. The method of claim 1, further comprising:
acquiring the modeling data from a predetermined database.

3. The method of claim 1, further comprising:
acquiring a reference threshold value from the predetermined database;
determining the intensity of the contrast medium in each of the cross sections based on the modeling data; and
setting the threshold value for each of the cross sections based on the reference threshold value and the determined intensity of the contrast medium in each of the cross sections.

4. The method of claim 3, further comprising:
determining a weight value for each of characteristics in the modeling data based on predetermined physiological characteristics; and
calculating the intensity of the contrast medium in each of the cross sections based on the weight value for each of the characteristics.

5. The method of claim 3, further comprising:
setting the threshold value for a cross section, among the cross sections, comprising a relatively lesser intensity of the contrast medium to be less than the threshold value for another cross section, among the cross sections, comprising a relatively greater intensity of the contrast medium.

6. The method of claim 3, further comprising:
setting the threshold value for a cross section, among the cross sections, comprising a relatively lesser intensity of the contrast medium to be less than the reference threshold value; and
setting the threshold value for another cross section, among the cross sections, comprising a relatively greater intensity of the contrast medium to be greater than the reference threshold value.

7. The method of claim 1, further comprising:
comparing the intensity of the contrast medium in a cross section among the cross sections in the image to the threshold value for the cross section; and
determining the cross section to be a boundary of the blood vessel in response to the intensity of the contrast medium in the cross section being greater than or equal than the threshold value for the cross section.

8. The method of claim 1, further comprising:
extracting a region of the blood vessel from the image; and
acquiring an intensity characteristic of the contrast medium in the region, the intensity characteristic of the contrast medium depending on characteristics of the blood vessel.

9. The method of claim 8, wherein the intensity characteristic comprises a mean intensity of the contrast medium in the region, or a maximum intensity of the contrast medium in the region, or a minimum intensity of the contrast medium in the region, or a variation in the intensity of the contrast medium in the region, or any combination thereof.

10. The method of claim 8, further comprising:
calculating the reference threshold value based on the intensity characteristic;
determining the intensity of the contrast medium in each of the cross sections based on the intensity characteristic and the modeling data; and
setting the threshold value for each of the cross sections based on the reference threshold value and the determined intensity of the contrast medium in each of the cross sections.

11. The method of claim 10, further comprising:
determining a weight value for each of the intensity characteristic and characteristics in the modeling data based on predetermined physiological characteristics; and calculating the intensity of the contrast medium in each of the cross sections based on the weight value for each of the intensity characteristic and the characteristics.

12. A non-transitory computer-readable storage medium storing a program comprising instructions to cause a computer to perform the method of claim 1.

13. A vessel segmentation apparatus comprising:
a processor configured to
acquire an image of a blood vessel, comprising cross sections, using a contrast medium,
set a threshold value for each of the cross sections based on modeling data associated with an intensity of the contrast medium, the modeling data comprising a node-dependent attenuation characteristic varying responsive to a total size of cross sections of branches splitting-off from a stem of the blood vessel relative to a size of the cross section of the stem, and
perform vessel segmentation based on the image and the threshold value for each of the cross sections.

14. The apparatus of claim 13, wherein the processor is further configured to:
acquire the data from a predetermined database.

15. The apparatus of claim 13, wherein the processor is further configured to:
acquire a reference threshold value from the predetermined database;
determine the intensity of the contrast medium in each of the cross sections based on the modeling data; and
set the threshold value for each of the cross sections based on the reference threshold value and the determined intensity of the contrast medium in each of the cross sections.

16. The apparatus of claim 15, wherein the processor is further configured to:
set the threshold value for a cross section, among the cross sections, comprising a relatively lesser intensity of the contrast medium to be less than the reference threshold value; and
set the threshold value for another cross section, among the cross sections, comprising a relatively greater intensity of the contrast medium to be greater than the reference threshold value.

17. The apparatus of claim 13, wherein the processor is further configured to:
compare the intensity of the contrast medium in a cross section among the cross sections in the image to the threshold value for the cross section; and
determine the cross section to be a boundary of the blood vessel in response to the intensity of the contrast medium in the cross section being greater than or equal than the threshold value for the cross section.

18. The apparatus of claim 13, wherein the processor is further configured to:
extract a region of the blood vessel from the image; and
acquire an intensity characteristic of the contrast medium in the region, the intensity characteristic of the contrast medium depending on characteristics of the blood vessel.

19. The apparatus of claim 18, wherein the processor is further configured to:
calculate the reference threshold value based on the intensity characteristic;
determine the intensity of the contrast medium in each of the cross sections based on the intensity characteristic and the modeling data; and set the threshold value for each of the cross sections based on the reference threshold value and the determined intensity of the contrast medium in each of the cross sections.

20. The method of claim 1, wherein the modeling data comprises a distance-dependent attenuation characteristic, a time-dependent attenuation characteristic, and a cardiac cycle-dependent attenuation characteristic, or any combination thereof.

21. The method of claim 20, wherein
the distance-dependent attenuation characteristic is based on a distance traveled by the contrast medium through the blood vessel,
the time-dependent attenuation characteristic is based on a time elapsed from an injection of the contrast medium into the blood vessel, and
the cardiac cycle-dependent attenuation characteristic is based on a cardiac cycle.

\* \* \* \* \*